(12) United States Patent
Song

(10) Patent No.: US 8,159,363 B2
(45) Date of Patent: Apr. 17, 2012

(54) USING GRAVITY TO DIRECT A ROTATABLE CAMERA IN A HANDHELD ELECTRONIC DEVICE

(75) Inventor: Jae Ryee Song, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 673 days.

(21) Appl. No.: 12/371,768

(22) Filed: Feb. 16, 2009

(65) Prior Publication Data

US 2010/0207774 A1    Aug. 19, 2010

(51) Int. Cl.
G08B 21/00    (2006.01)
(52) U.S. Cl. ........... 340/686.6; 340/995.17; 340/995.19; 340/995.24
(58) Field of Classification Search ............. 340/995.17, 340/995.19, 995.24, 686.6, 540; 701/211, 701/208, 209
See application file for complete search history.

(56) References Cited

U.S. PATENT DOCUMENTS

| | | | |
|---|---|---|---|
| 5,412,417 A | 5/1995 | Tozuka | |
| 5,963,749 A | 10/1999 | Nicholson | |
| 6,097,423 A | 8/2000 | Mattsson-Boze et al. | |
| 6,535,114 B1 | 3/2003 | Suzuki et al. | |
| 6,611,661 B2 | 8/2003 | Buck | |
| 6,747,690 B2 | 6/2004 | Molgaard | |
| 6,751,410 B1 | 6/2004 | Stavely | |
| 6,820,980 B1 | 11/2004 | Romanoff et al. | |
| 7,054,552 B2 | 5/2006 | Konttinen | |
| 7,134,992 B2 | 11/2006 | Schara et al. | |
| 7,138,979 B2 | 11/2006 | Robin et al. | |
| 7,307,653 B2 | 12/2007 | Dutta | |
| 2003/0227564 A1* | 12/2003 | Lim | 348/375 |
| 2004/0100479 A1* | 5/2004 | Nakano et al. | 345/700 |
| 2004/0119836 A1 | 6/2004 | Kitaguchi | |
| 2005/0007467 A1 | 1/2005 | Battles et al. | |
| 2005/0264653 A1 | 12/2005 | Starkweather et al. | |
| 2006/0074549 A1* | 4/2006 | Takahashi et al. | 701/207 |
| 2006/0177103 A1 | 8/2006 | Hildreth | |
| 2006/0204232 A1 | 9/2006 | Weinberg et al. | |

(Continued)

FOREIGN PATENT DOCUMENTS

EP    1220143    7/2002

(Continued)

OTHER PUBLICATIONS

Steves Digicams, "Nikon Coolpix S4 Review", Nov. 16, 2005.

(Continued)

*Primary Examiner* — Daryl Pope
(74) *Attorney, Agent, or Firm* — Integral Intellectual Property Inc.; Miriam Paton

(57) ABSTRACT

In a handheld electronic device, a motor is controlled to adjust, according to input received at a user-input element of the device, an angle of rotation of a camera module about a rotation axis of the camera module. The camera module is partially embedded in a housing of the device. An image sensor is embedded in the camera module and senses an image in a field of view that is centered around a line of sight. The line of sight is perpendicular to the rotation axis. An orientation of the housing relative to a direction of gravity is sensed, and the motor is controlled to rotate the camera module and hence the line of sight about the rotation axis to achieve a particular angle between the line of sight and the direction of gravity.

21 Claims, 7 Drawing Sheets

U.S. PATENT DOCUMENTS

| | | |
|---|---|---|
| 2006/0206003 A1 | 9/2006 | Hoeg et al. |
| 2007/0071438 A1 | 3/2007 | Huang et al. |
| 2007/0120960 A1 | 5/2007 | Chang |
| 2007/0273752 A1 | 11/2007 | Chambers et al. |
| 2011/0141254 A1* | 6/2011 | Roebke et al. .................. 348/61 |

FOREIGN PATENT DOCUMENTS

| | | |
|---|---|---|
| JP | 2002050978 | 2/2002 |
| JP | 2006301838 | 11/2006 |
| JP | 2007027950 | 2/2007 |
| JP | 2007121491 | 5/2007 |

OTHER PUBLICATIONS

The Imaging Resource, "Quick Review—Nikon Coolpix 2500 Digital Camera", The most interesting design feature is the rotating lens, which swivels approximately 230 degrees inside the camera's frame, to a range of shooting angles. Feb. 21, 2002.

Dolezel, Tomas, Extended European Search Report for E09152957.8, Jun. 9, 2009.

Adam Pash, "Email 'n Walk lets you multitask without getting hit by a car", May 15, 2009.

* cited by examiner

USING GRAVITY TO DIRECT A ROTATABLE CAMERA IN A HANDHELD ELECTRONIC DEVICE

BACKGROUND OF THE INVENTION

It is not uncommon for people using handheld electronic devices to become so engrossed in applications running on the handheld electronic devices that their visual awareness of their surroundings is diminished, at least momentarily. Tasks that demand the user's attention and concentration include, for example, reading or composing a message, viewing a movie displayed on a handheld media player, engaging in a video telephone call, browsing the Internet, and playing a game on a handheld gaming device. The diminished visual awareness of the surroundings may be potentially dangerous to the user and to other people in the vicinity of the user.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIGS. 4-1, 4-2 and 4-3 are simplified illustrations of different display modes for images from the image sensor;

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

A camera module is partially embedded in the housing of a handheld electronic device. An image sensor able to sense an image in a field of view that is centered around a line of sight is embedded in the camera module. The line of sight is perpendicular to a rotation axis of the camera module. A motor in the handheld electronic device is controllable by a processor of the handheld electronic device to adjust an angle of rotation of the camera module, and hence the line of sight, about the rotation axis. An image sensed by the image sensor may be displayed in a display of the handheld device.

The handheld electronic device may comprise a tilt sensor to sense an orientation of the housing relative to a direction of gravity. The motor may be controlled to rotate the camera module, and hence the line of sight, about the rotation axis to achieve a particular angle between the line of sight and the direction of gravity. The motor may be further controlled to rotate the camera module, and hence the line of sight, about the rotation axis as the orientation changes to maintain the particular angle between the line of sight and the direction of gravity. The particular angle may be preprogrammed to memory or may be set according to input received at a user-input element of the device.

Image processing may be employed to process the image sensed by the image sensor. One or more events may be detected as a result of the image processing. For example, the event may be appearance of an object or an obstacle or the detection of motion in the field of view. An audible effect or visual effect or both may be produced in response to detecting one or more events, in order to alert a user of the device to the detected event.

Figure 1:
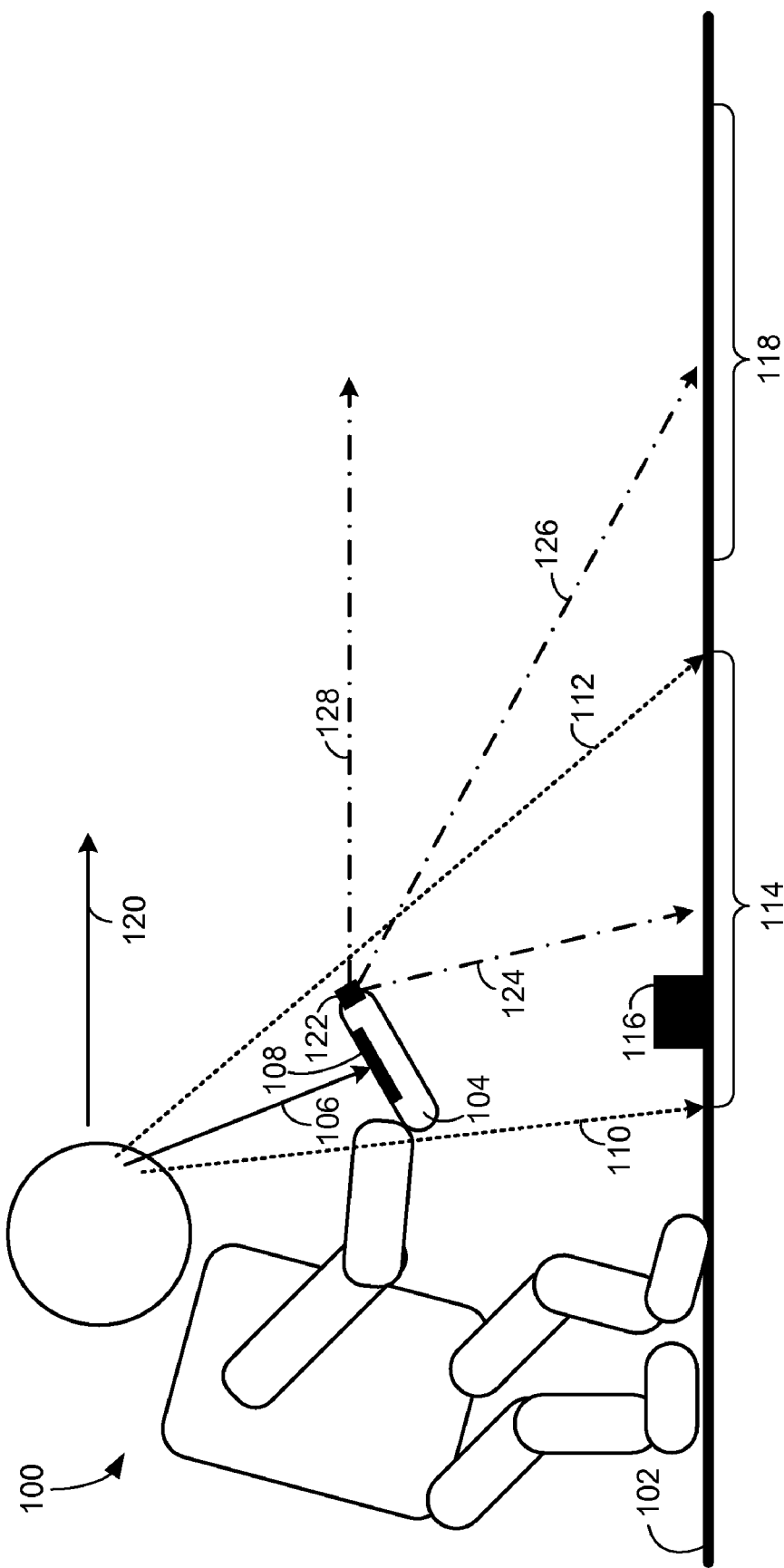
FIGS. 1, 2-1 and 2-2 are simplified schematic illustrations of a person, holding and using a handheld electronic device having a rotatable image sensor.

Reference is made to FIG. 1, which is a simplified schematic illustration of a person 100, the "user", on a terrain 102, holding and using a handheld electronic device 104. A non-exhaustive list of examples for handheld electronic device 104 includes a personal digital assistant (PDA), a mobile phone, a pager, a handheld gaming device, a handheld media player, a smartphone, an electronic mail client, an instant messaging client, and the like.

While the user's attention and concentration are directed toward a display 108 of device 104, this defines a line of sight 106 that is also directed toward display 108. Peripheral vision is the ability to see objects and movement outside of the direct line of vision, and this ability varies from person to person due to factors such as age, training and eye health. Arrows 110 and 112 illustrate the limits of the user's peripheral vision while the direct line of vision is line of sight 106, and correspond to a portion 114 of terrain 102. The length of portion 114 and its distance from the user are related to the angle of line of sight 106. In many cases, line of sight 106 is such that portion 114 is only a few meters in length and is very close to the user.

While the user is looking at device 104 along line of sight 106, most of portion 114 is obscured by device 104. Moreover, since the user's attention is directed toward device 104, the user may not fully comprehend what he or she sees in his or her peripheral vision. Consequently, if the user is walking, he or she may encounter an obstacle 116 that is located in or on portion 114 and is obscured by device 104. Although obstacle 116 is illustrated as an object, in other examples obstacle 116 may be stairs, a hole, an animal or person, uneven terrain, or any other obstacle.

The technology described herein may provide a user with enhanced visual awareness of his or her surroundings while the user's vision is directed to a display of a handheld electronic device. The enhanced visual awareness may relate to surroundings that would be within the user's peripheral vision if not obscured by the handheld electronic device. For example, the technology may provide the user with enhanced visual awareness of parts of portion 114 that are obscured by device 104. The enhanced visual awareness may relate to surroundings that would not be within the user's peripheral vision. For example, the technology may provide the user with visual awareness of a portion 118 of terrain 102 that is further away from him or her than portion 114. In another example, the technology may provide the user with visual awareness of what is in front of him or her, as indicated by an arrow 120.

Device 104 comprises an image sensor 122 that is able to sense images in its field of view, which is centered around the image sensor's line of sight. Images sensed by image sensor 122 may be displayed on display 108. A non-exhaustive list of examples for image sensor 122 includes a charge-coupled device (CCD) sensor, a complementary metal-oxide-semiconductor (CMOS) sensor, and any other suitable image sensor. Device 104 also comprises a motor (not shown), with which device 104 can control the rotation of image sensor 122 about a rotation axis that is perpendicular to the image sensor's line of sight. Consequently, device 104 can change the line of sight of image sensor 122 "up" and "down" relative to the angle at which device 104 is held by the user.

Three exemplary directions 124, 126 and 128 for the line of sight of image sensor 122 are illustrated in FIG. 1: a substantially "down" direction 124, a substantially "down and forward" direction 126, and a substantially "forward" direction 128. While pointing in direction 124, image sensor 122 may provide a view of portion 114. While pointing in direction 126, image sensor 122 may provide a view of farther portion 118. While pointing in direction 128, image sensor 122 provides a view in the direction of arrow 120. The line of sight of image sensor 122 may be controlled by device 104 in other directions not explicitly illustrated in FIG. 1. Displaying the images sensed by image sensor 122 on display 108 may enhance the visual awareness of the surroundings of the user using device 104.

The user may be able to control the rotation of image sensor 122 using any suitable user-input element of device 104, for example, by rotating a trackball or a wheel, by pressing buttons, by pressing keys of a keyboard, by providing voice commands, by touching a touch screen or by sliding a finger on the touch screen.

Figures 1, 2:
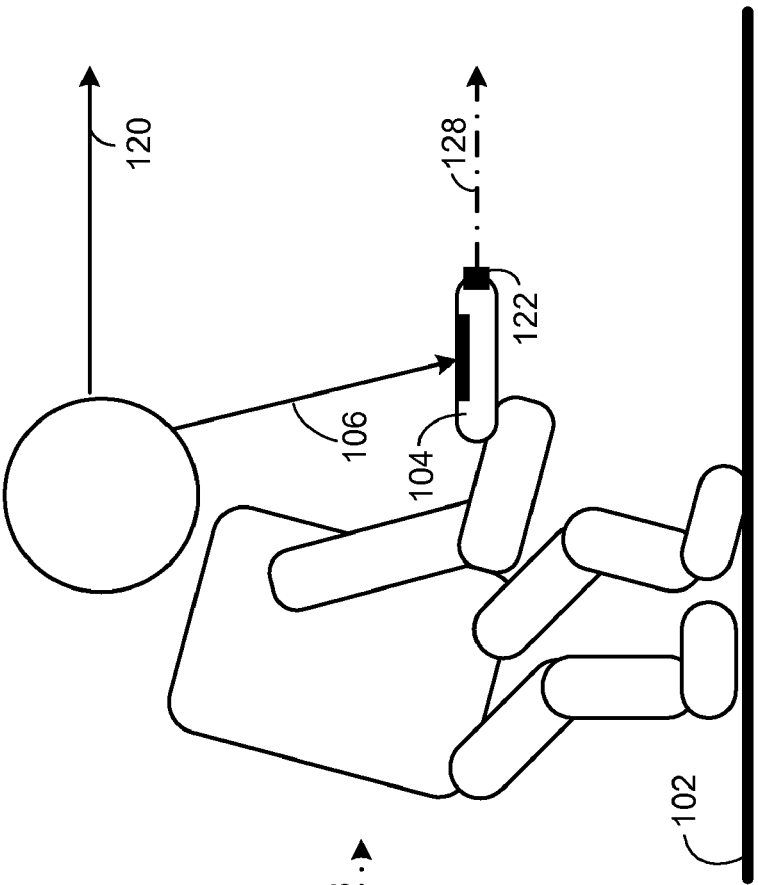
Figure 2:
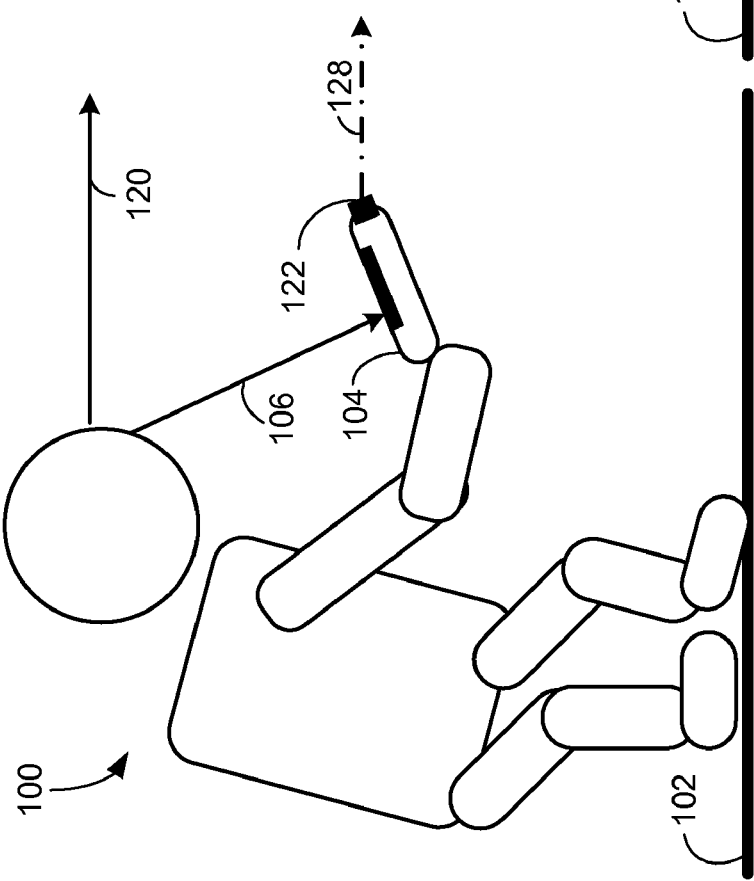

Reference is made to FIGS. 2-1 and 2-2, which illustrate device 104 being held by the user in different positions than the position in which it is held by the user in FIG. 1. The technology described herein may enable device 104 to control the line of sight of image sensor 122 to be in a desired direction, regardless of the position of device 104. In FIGS. 2-1 and 2-2, the line of sight points in substantially "forward" direction 128 to provide a view in the direction of arrow 120. However, other directions for the line of sight of image sensor 122 are also contemplated.

Figure 3:
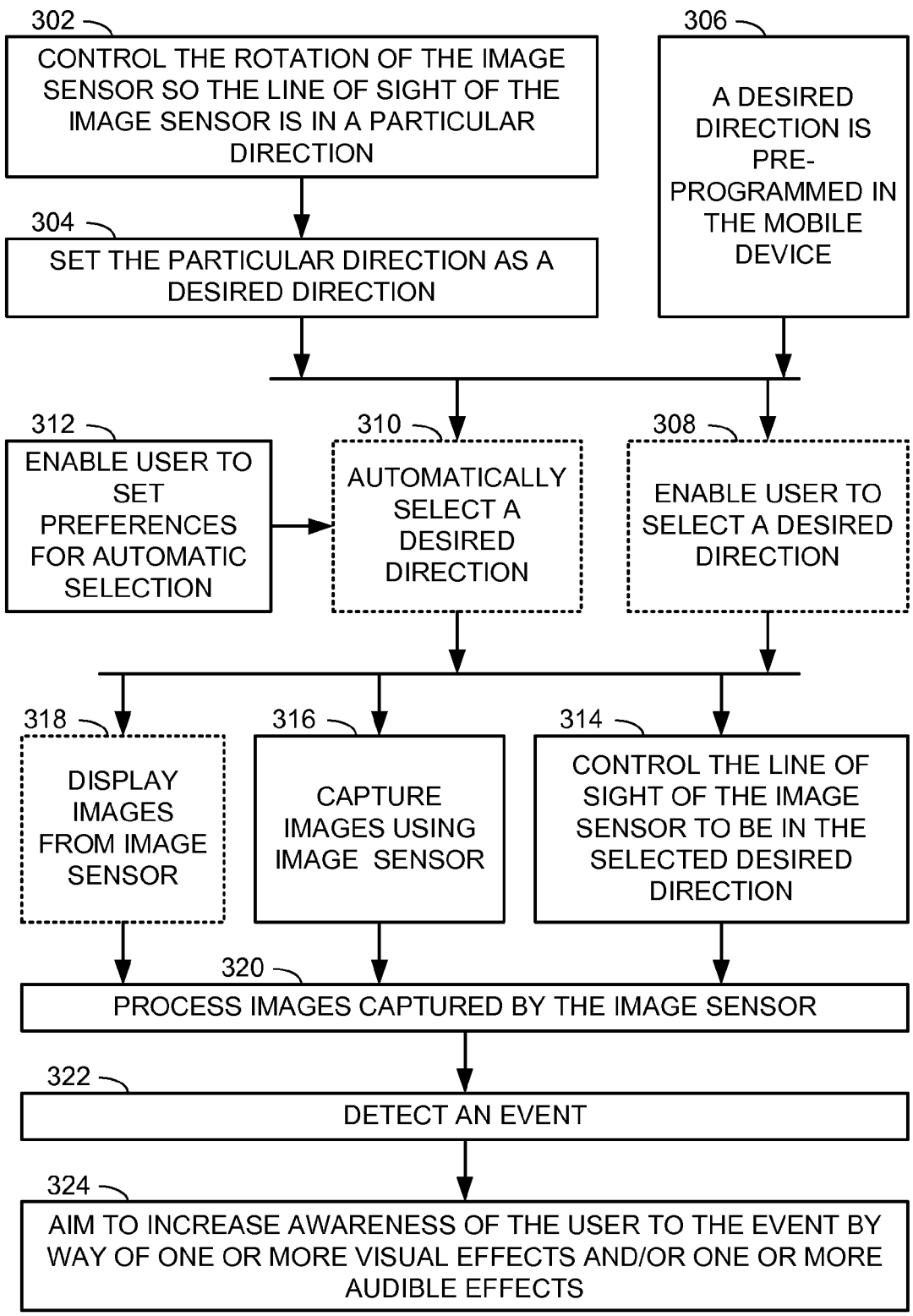
FIG. 3 is a simplified flowchart of a method in a handheld electronic device.

In order to keep the line of sight of image sensor 122 in a desired direction, device 104 may include a control mechanism, and may use the direction of gravity as a reference for this control mechanism. Reference is made additionally to FIG. 3, which is a simplified flowchart of a method in a handheld device. As shown in FIG. 3, one or more desired directions may be recorded in device 104 to indicate the angles between one or more desired directions and the direction of gravity.

Device 104 may enable the user to set one or more desired directions using any suitable user-input element of device 104. At 302, device 104 may enable the user to first control the rotation of image sensor 122 so the line of sight of image sensor 122 is in a particular direction, as explained hereinabove. Subsequently, at 304, device 104 may enable the user to use a suitable user-input element of device 104 to set the particular direction as a desired direction, for example, by pressing a trackball, a wheel, a button or a key, by providing voice commands or by touching a touch screen. Alternatively, or additionally, as shown at 306, one or more desired directions may be preprogrammed in device 104, for example, during manufacturing or with a downloadable software update downloaded to device 104.

If two or more desired directions are available in device 104 (set by the user or preprogrammed or both), device 104 may enable the user to select which desired direction to use, as shown in 308, for example via a graphical user interface displayed on display 108.

Alternatively, as shown in 310, device 104 may be able to automatically select between desired directions according to predefined criteria. For example, device 104 may select a substantially "down" direction if device 104 senses that it is stationary, and device 104 may select a substantially "forward" direction if device 104 senses that it is not stationary. In another example, device 104 may select a substantially "forward" direction if device 104 senses that it is stationary, and device 104 may select a substantially "down" direction if device 104 senses that it is not stationary. As shown in 312, device 104 may enable the user to define the way in which device 104 is to select between desired directions according to the user's individual preferences, for example, via a graphical user interface displayed on display 108. As shown in 314, device 104 may aim to control the line of sight of image sensor 122 to be in the selected desired direction, and may operate image sensor 122 to capture images, as shown in 316. Device 104 may optionally display images captured by image sensor 122 on display 108, as shown in 318.

There are many different ways in which images sensed by image sensor 122 may be displayed on display 108. Three examples are illustrated in FIGS. 4-1, 4-2 and 4-3, respectively.

Figures 1, 4:
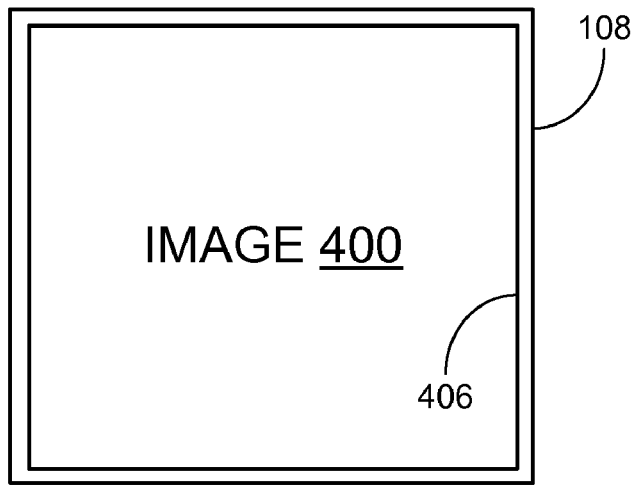
Figures 2, 4:
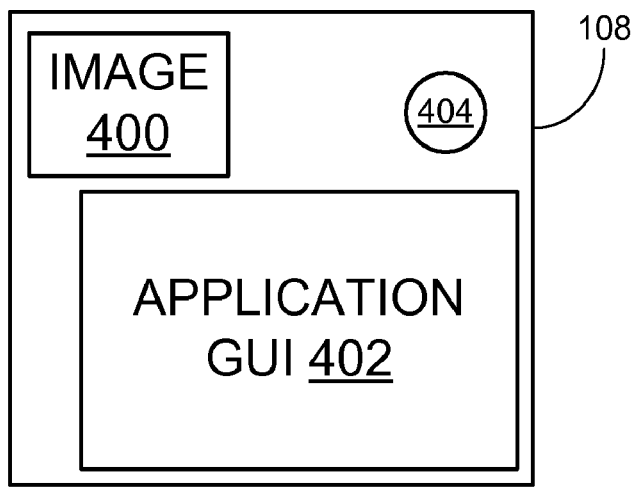
Figures 3, 4:
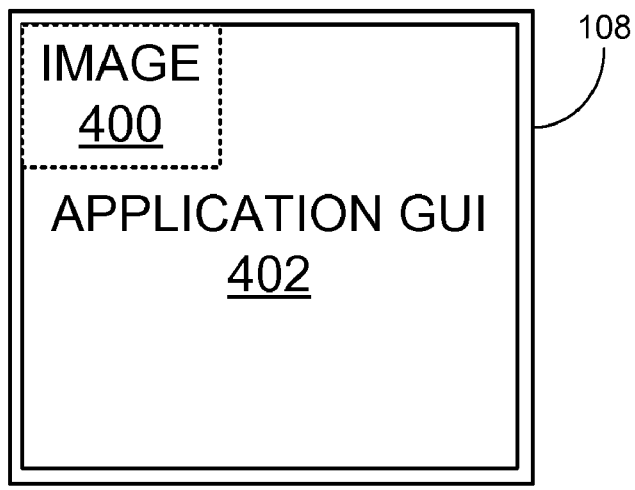

FIG. 4-1 illustrates an exemplary "full screen" display mode in which an image 400 from image sensor 122 occupies most or all of display 108.

FIG. 4-2 illustrates a "small window" display mode, applicable when the user is operating an application running on device 104 that has a graphical user interface (GUI) 402. In this display mode, image 400 from image sensor 122 occupies a smaller area of display 108 than the area occupied by the graphical user interface 402 of the application.

FIG. 4-3 illustrates a "picture in picture" display mode, applicable when the user is operating an application running on device 104 that has GUI 402. In this display mode, image 400 from image sensor 122 is displayed in "picture in picture" fashion, so that it obscures a portion of the area occupied by GUI 402 on display 108. Although image 400 is shown in FIG. 4-3 in the top left corner of display 108, device 104 may place image 400 in a different portion of display 108 so as to minimize interference with the operation of the application having GUI 402. For example, if GUI 402 includes an area designated for data entry and the application is awaiting input from the user, device 104 may assess whether image 400 obscures the area designated for data entry and may place image 400 in different portion of display 108 so as not to obscure or to obscure less of the area designated for data entry.

The user may be able to select a display mode or to switch between different display modes using any suitable user-input element of device 104, such as, for example, a trackball, a wheel, a button, a key, an audio input element or a touch screen.

Device 104 may incorporate image processing technology and as shown at 320, device 104 may use this image processing technology to process images captured by image sensor 122. Using the image processing technology, device 104 may be able to detect events that appear in images captured by image sensor 122. Such events may be, for example, appearance of an object, detection of motion of an object, detection of an obstacle and so forth.

At 322, device 104 detects such an event, and at 324, device 104 aims to increase awareness of the user to the event by producing one or more visual effects or one or more audible effects or both.

A non-exhaustive list of examples of visual effects includes: displaying image 400 on display 108, if not yet displayed; displaying a visual alert on display 108, for example, a flickering image 404, shown in FIG. 4-2, or by flashing an edge 406 of image 400; switching between display modes of image 400; or resizing image 400 on display 108. For example, device 104 may set the size of image 400 to a relatively large size if motion of an object is captured in image 400 or if a potential obstacle is captured in image 400 or both, and may set the size of image 400 to a relatively small size otherwise. Other suitable visual effects are also contemplated.

A non-exhaustive list of examples of audible effects includes sounding an audible alert via an audio output element of device 104.

Figure 5:
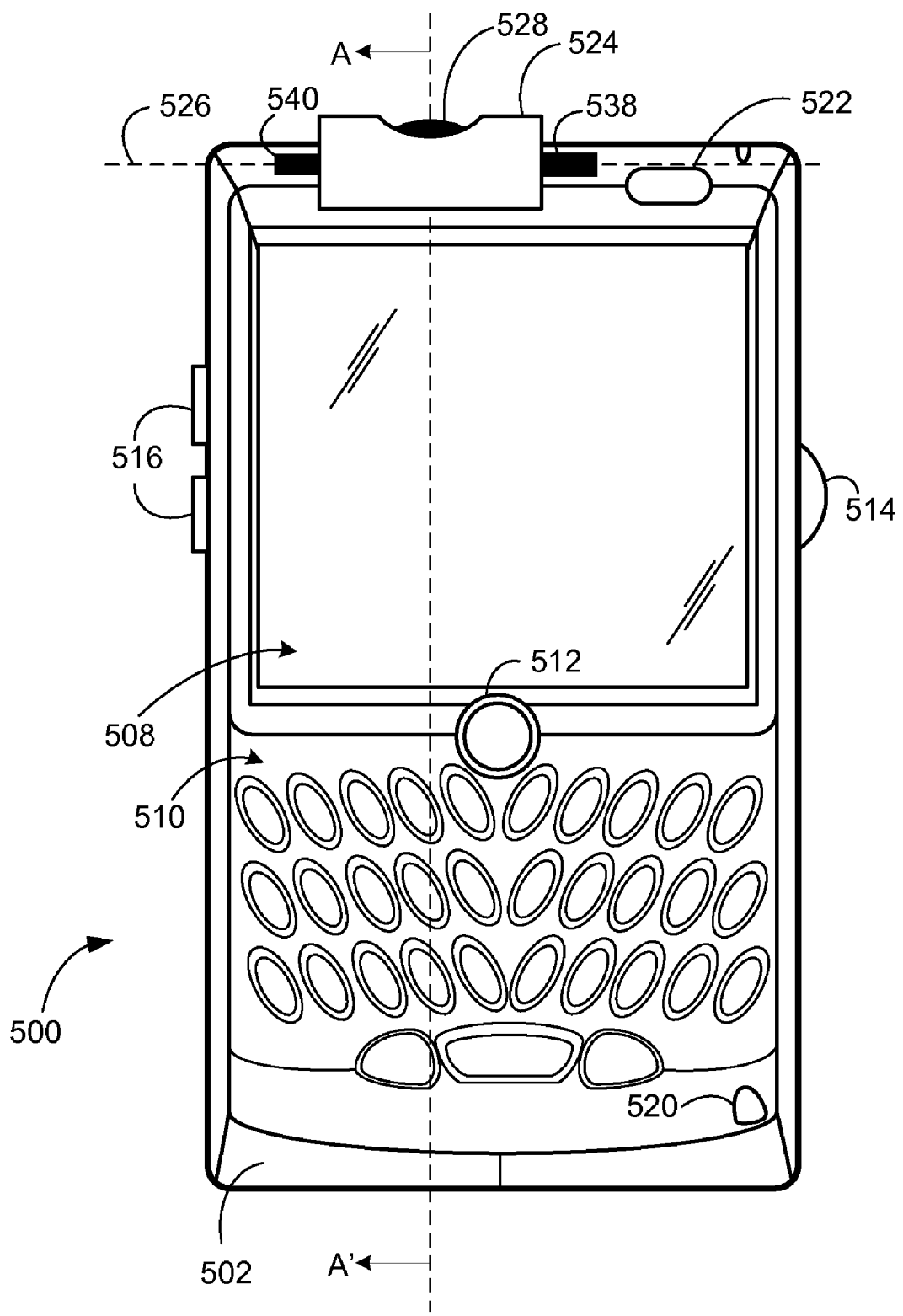
FIG. 5 is a simplified front view illustration of an exemplary handheld electronic device having a rotatable image sensor.
Figure 6:
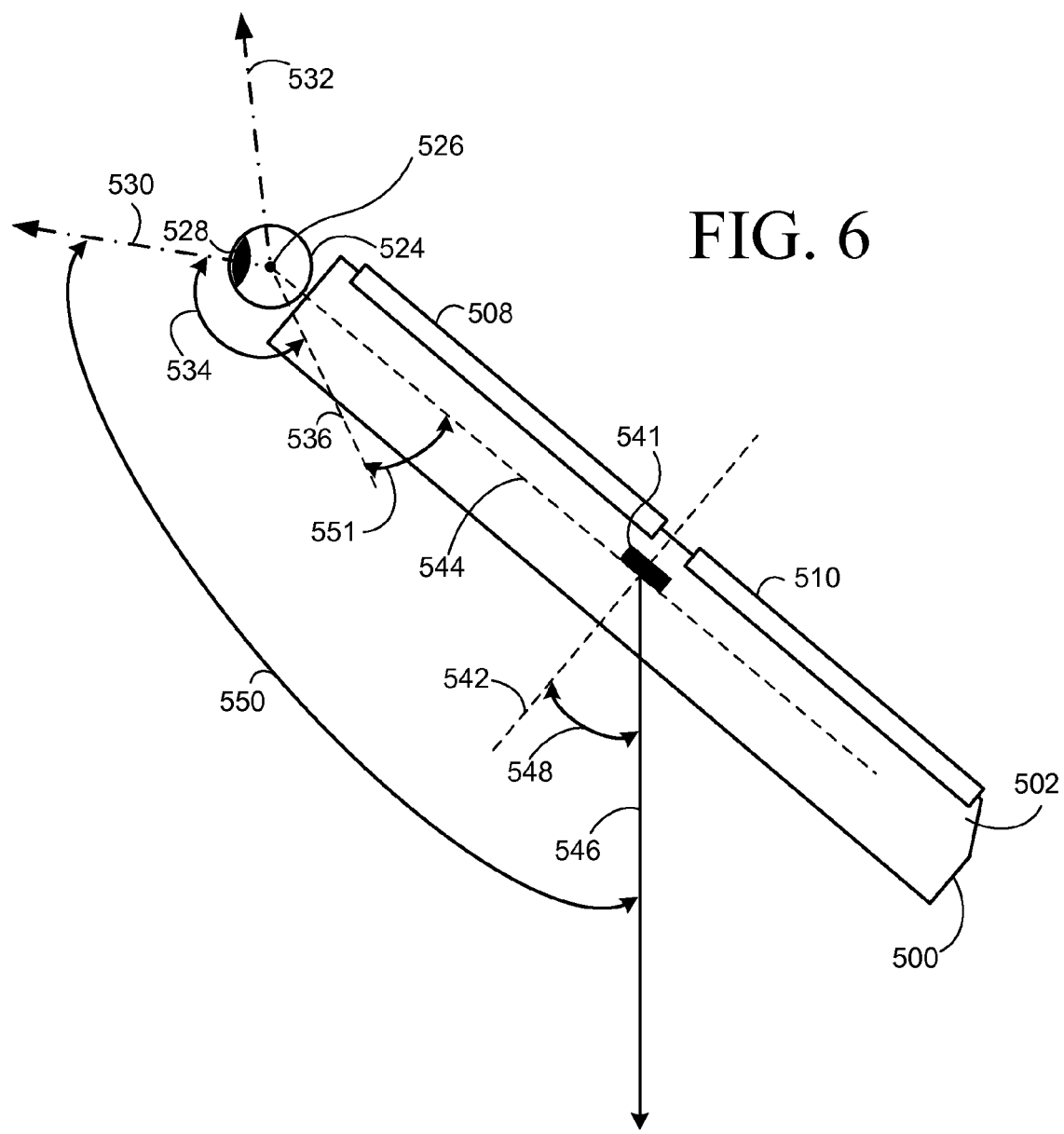
FIG. 6 is a simplified side view illustration of the handheld electronic device of FIG. 5 along a section A to A'.
Figure 7:
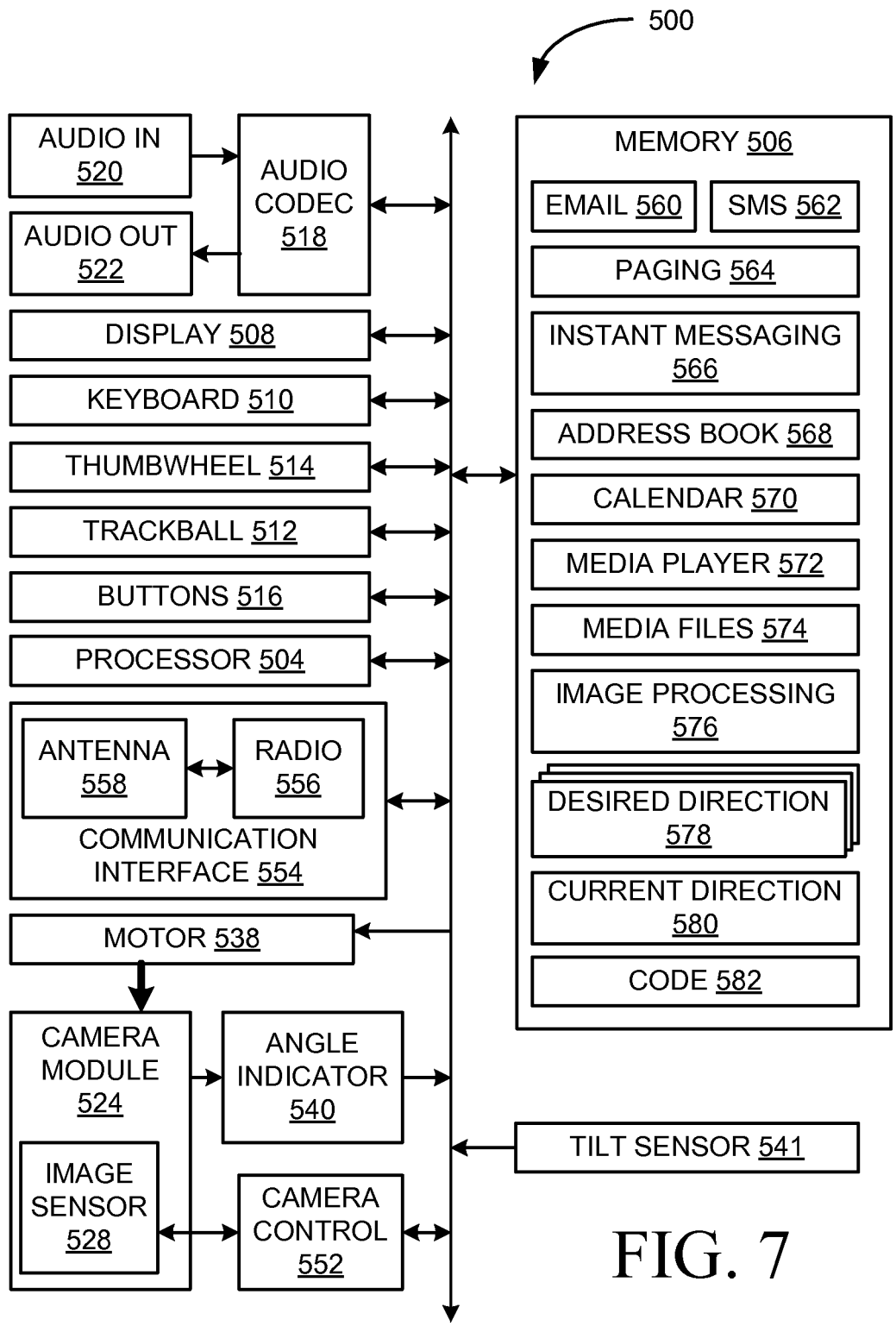
FIG. 7 is a simplified block diagram of an exemplary handheld electronic device.

Reference is made now to FIGS. 5, 6 and 7. FIG. 5 is a simplified front view illustration of an exemplary handheld electronic device 500, FIG. 6 is a simplified side view illustration of device 500 along a section A-A', and FIG. 7 is a simplified block diagram of device 500. For clarity, some components and features of device 500 are not shown in FIGS. 5, 6 and 7 and are not described explicitly below. Device 500 is an example of device 104.

Device 500 has a housing 502 that encloses the different components of device 500. For simplicity, FIGS. 5 and 6 show housing 502 as made of a single piece. However, housing 502 may be made of one, two or more pieces connected together. For example, a keyboard may slide in and out on a main part of the housing. In another example, housing 502 may have two or more sections that fold via a hinge.

Device 500 includes a processor 504 enclosed within housing 502. Device 500 also includes a memory 506, a display 508 and a keyboard 510, all coupled to processor 504. Keyboard 510 may be embedded in full or in part within display 508, i.e. display 508 may be a "touch screen". Device 500 may include one or more tactile user-input elements devices coupled to processor 504. A non-exhaustive list of examples for such tactile user-input elements includes a trackball 512 that is rollable and pressable, a wheel 514 that is rotatable and pressable, and buttons 516 that may have programmable functionality.

Device 500 may include an audio coder-decoder (codec) 518 coupled to processor 504. Device 500 may include an audio input element 520, for example a microphone, and an audio output element 522, for example, a speaker, both coupled to codec 518. Device 500 may include one or more connectors (not shown) to connect to an external audio input element or an external audio output element or both. The one or more connectors may be included in device 500 instead of, or in addition to, audio input element 520 or audio output element 522 or both. Device 500 may include additional user interface elements that are not shown in FIGS. 5, 6 and 7.

Device 500 includes a camera module 524 that is partially embedded in housing 502 and is rotatable about a rotation axis 526. An image sensor 528 embedded in camera module 524 has a line of sight 530 that is perpendicular to rotation axis 526 at any rotational position of camera module 524 about rotation axis 526. FIG. 6 shows camera module 524 in an exemplary rotational position in which image sensor 528 has a line of sight 530. A second exemplary line of sight 532 for another rotational position of camera module 524 is also shown in FIG. 6. Section A-A' shown in FIG. 5 is a plane defined by lines of sight 530 and 532. Rotation of camera module 524 can be expressed by an angle 534 between line of sight 530 and an arbitrary reference axis 536 that is perpendicular to rotation axis 526.

Device 500 includes a motor 538 that is coupled to housing 502 and to camera module 524, and is controllable by processor 504 to manipulate angle 534. Device 500 includes an angle indicator 540, for example an encoder, which can sense angle 534 and report its value or a correlated value to processor 504. It may be noted that many different mechanical implementations are possible for elements 524, 528, 538 and 540. For clarity of the description, elements 524, 528, 538 and 540 are presented in FIGS. 5 and 6 in a simplified manner that does not presume any particular mechanical implementation.

Device 500 includes a tilt sensor 541, for example, an accelerometer or a gyroscope. Tilt sensor 541 may be a Micro Electrical Mechanical System (MEMS) device. For example, Analog Devices, Inc. of Norwood, Mass., USA produces a family of integrated MEMS accelerometers and a family of integrated MEMS gyroscopes. Tilt sensor 541 provides measurements in at least two perpendicular axes and is mounted in device 500 so that these two axes are parallel to the plane defined by lines of sight 530 and 532. As an example, FIG. 6 shows two perpendicular axes 542 and 544 in which orientation sensor 542 provide measurements. For simplicity, axis 544 is shown parallel to an edge of housing 502 and intersecting with rotation axis 526, but this relationship between axis 544, housing 502 and rotation axis 526 is not an essential requirement.

Tilt sensor 541 is able to indicate a direction of gravity 546 relative to axis 542 and 544. The type of indication may vary according to the design of tilt sensor 541. In one non-limiting example, tilt sensor 541 may output a rectangular wave and may use pulse width modulation (PWM) to reflect an angle 548 between axis 542 and direction of gravity 546.

Processor 504 may calculate an angle 550 between the direction of gravity 546 and line of sight 530 from the following information: a) angle 548 corresponding to the orientation of housing 502 relative to the direction of gravity 546, b) an angle 551 between axis 544 and reference axis 536, and c) angle 534 corresponding to the rotation of camera module 524 about rotation axis 526 relative to reference axis 536.

Device 500 includes a camera control module 552 that operates image sensor 528 for capturing video images, still images, or both.

Device 500 may optionally include a wireless communication interface 554, compatible with a wireless communication standard, coupled to processor 504 and including at least a radio 556 and one or more antennae 558. By way of wireless communication interface 554 and a communication infrastructure (not shown) that is external to device 500, device 500 may be able to establish voice, video and/or data communication sessions with other devices (not shown). A non-exhaustive list of examples for data communication sessions includes sending and receiving electronic mail (email), instant messages, paging messages, short message service (SMS) messages, and any other suitable data communication sessions. For data communications supported by device 500, memory 506 may store respective software modules to be executed by processor 504, for example, an email software module 560, an SMS software module 562, a paging software module 564 and an instant messaging software module 566.

Memory 506 may store application modules, for example, an "address book" application module 568 to manage information related to individuals and organizations, a "calendar" application module 570 to manage information related to calendar events such as appointments and meetings, and a media player module 572. Memory 504 may store media files 574 including audio, video, and/or stills pictures information. Any of media files 574 may include information captured by image sensor 528. Media player 572 may be able to play media files 574 using display 508 or audio output element 522 or both, as appropriate.

Memory 506 may store an image processing module 576 able to detect motion and/or potential obstacles in images captured by image sensor 528. Memory 104 may store one or more desired directions 578 so to indicate the angles between a plurality of desired directions of the line of sight of image sensor 122 and the direction of gravity. Memory 104 may store an indication 580 of the direction of a current line of sight of image sensor 122 and the direction of gravity.

Memory 104 may store executable code 582 which, when executed by processor 504, causes device 500 to perform any of the methods described herein.

A non-exhaustive list of examples for standards with which wireless communication interface 544 may comply includes Direct Sequence-Code Division Multiple Access (DS-CDMA) cellular radiotelephone communication, Global System for Mobile Communications (GSM) cellular radiotelephone, North American Digital Cellular (NADC) cellular radiotelephone, Time Division Multiple Access (TDMA), Extended-TDMA (E-TDMA) cellular radiotelephone, wideband CDMA (WCDMA), General Packet Radio Service (GPRS), Enhanced Data for GSM Evolution (EDGE), 3G and 4G communication.

Alternatively, device 500 may be "802.11-enabled", and wireless communication interface 544 may comply with one or more standards of the 802.11 family of standards defined by the Institute of Electrical and Electronic Engineers (IEEE) for Wireless LAN MAC and Physical layer (PHY) specifications.

A non-exhaustive list of examples for processor 504 includes microprocessors, microcontrollers, central processing units (CPU), digital signal processors (DSP), reduced instruction set computers (RISC), complex instruction set computers (CISC) and the like. Furthermore, processor 502 may comprise more than one processing unit, may be part of an application specific integrated circuit (ASIC) or may be a part of an application specific standard product (ASSP).

A non-exhaustive list of examples for memory 506 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

A non-exhaustive list of examples for antennae 558 includes dipole antennae, monopole antennae, multilayer ceramic antennae, planar inverted-F antennae, loop antennae, shot antennae, dual antennae, omnidirectional antennae and any other suitable antennae.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A handheld electronic device comprising:
a housing;
a processor enclosed within the housing;
a camera module partially embedded in the housing, wherein the camera module is rotatable relative to the housing about a rotation axis of the camera module;
an image sensor embedded in the camera module to sense an image in a field of view that is centered around a line of sight, wherein the line of sight is perpendicular to the rotation axis;
a display controlled by the processor to display the image;
a motor coupled to the housing and to the camera module, wherein the motor is controllable by the processor to rotate the camera module and hence the line of sight about the rotation axis relative to the housing;
a tilt sensor coupled to the processor to sense an orientation of the housing relative to a direction of gravity;
an angle indicator coupled to the processor to detect an angle of rotation of the camera module and hence the line of sight about the rotation axis relative to a reference axis that is perpendicular to the rotation axis; and
a memory able to store executable code which, when executed by the processor, controls the motor to rotate the camera module and hence the line of sight about the rotation axis to achieve and to keep a particular angle between the line of sight and the direction of gravity, based on the information from the tilt sensor and the angle indicator.

2. The handheld electronic device of claim 1, further comprising:
a user-input element coupled to the processor,
wherein the executable code, when executed by the processor, sets the particular angle as a function of input received at the user-input element.

3. The handheld electronic device of claim 1, wherein the tilt sensor comprises an accelerometer.

4. The handheld electronic device of claim 1, wherein the tilt sensor comprises a gyroscope.

5. The handheld electronic device of claim 1, wherein the executable code, when executed by the processor, further controls the motor to rotate the camera module and hence the line of sight about the rotation axis as the orientation changes to maintain the particular angle between the line of sight and the direction of gravity.

6. The handheld electronic device of claim 5, further comprising:
a user-input element coupled to the processor,
wherein the executable code, when executed by the processor, sets the particular angle as a function of input received at the user-input element.

7. The handheld electronic device of claim 5, wherein an indication of the particular angle is preprogrammed to the memory.

8. The handheld electronic device of claim 1, further comprising:
a user-input element coupled to the processor,
wherein the memory is able to store a plurality of indications of angles between the line of sight and the direction of gravity, and
wherein the executable code, when executed by the processor, selects the particular angle from the plurality as a function of input received at the user-input element.

9. The handheld electronic device of claim 1, wherein a plurality of indications of angles between the line of sight and the direction of gravity are preprogrammed to the memory, and wherein the executable code, when executed by the processor, selects the particular angle from the plurality according to predefined criteria.

10. A method performed in a handheld electronic device, the method comprising:

displaying in a display of the handheld electronic device an image sensed by an image sensor embedded in a camera module, wherein the image is sensed in a field of view that is centered around a line of sight;

sensing an orientation of a housing of the handheld electronic device relative to a direction of gravity, wherein the camera module is partially embedded in said housing and is rotatable relative to the housing about a rotation axis of the camera module;

detecting an angle of rotation, relative to a reference axis, of the camera module and hence of the line of sight about a rotation axis of the camera module, wherein the line of sight is perpendicular to the rotation axis; and controlling a motor of the handheld electronic device to rotate the camera module and hence the line of sight about the rotation axis to achieve a particular angle between the line of sight and the direction of gravity, based at least on the orientation of the housing relative to a direction of gravity and the angle of rotation of the camera module.

11. The method of claim 10, further comprising:
preprogramming the particular angle to the handheld electronic device.

12. The method of claim 10, further comprising:
receiving input at a user-input element of the handheld electronic device; and
setting the particular angle according to the input.

13. The method of claim 10, further comprising:
receiving input at a user-input element of the handheld electronic device,
wherein controlling the motor comprises controlling the motor according to the input.

14. The method of claim 10, further comprising:
controlling the motor to rotate the camera module and hence the line of sight about the rotation axis as the orientation changes to maintain the particular angle between the line of sight and the direction of gravity.

15. The method of claim 10, further comprising:
detecting an event that appears in the image; and
consequently, producing an effect to alert of the event.

16. The method of claim 15, wherein the event is appearance of an object.

17. The method of claim 15, wherein the event is detection of motion of an object.

18. The method of claim 15, wherein the effect is an audible effect.

19. The method of claim 15, wherein the effect is a visual effect.

20. The method claim 10, further comprising:
storing a plurality of indications of angles between the line of sight and the direction of gravity in the handheld electronic device; and
receiving input at a user-input element of the handheld electronic device and setting the particular angle from the plurality according as a function of the input.

21. The method of claim 10, further comprising:
preprogramming a plurality of indications of angles between the line of sight and the direction of gravity to the handheld electronic device; and
selecting the particular angle from the plurality according to predefined criteria.

* * * * *